Sept. 17, 1929. G. LISPENARD ET AL 1,728,556
COTTON HARVESTER
Filed Oct. 8, 1924 4 Sheets-Sheet 2
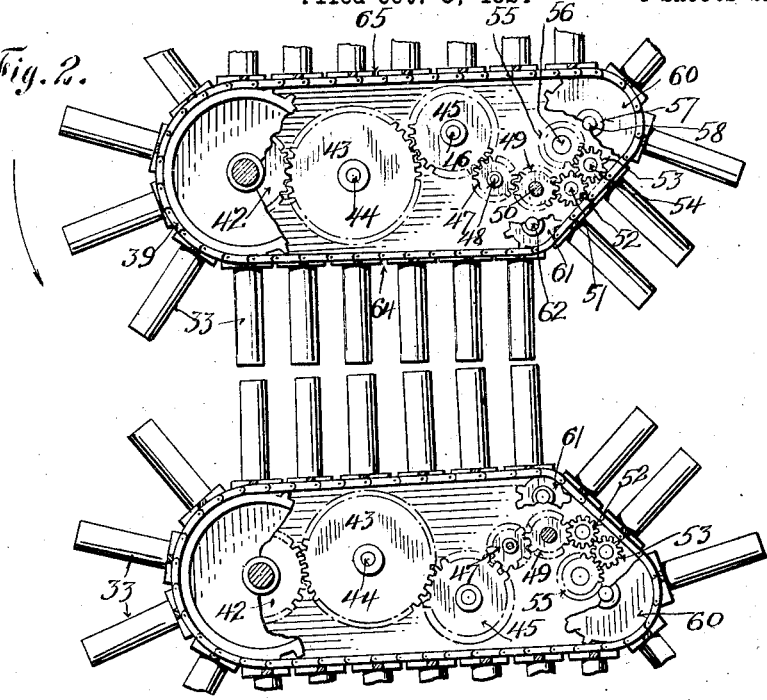
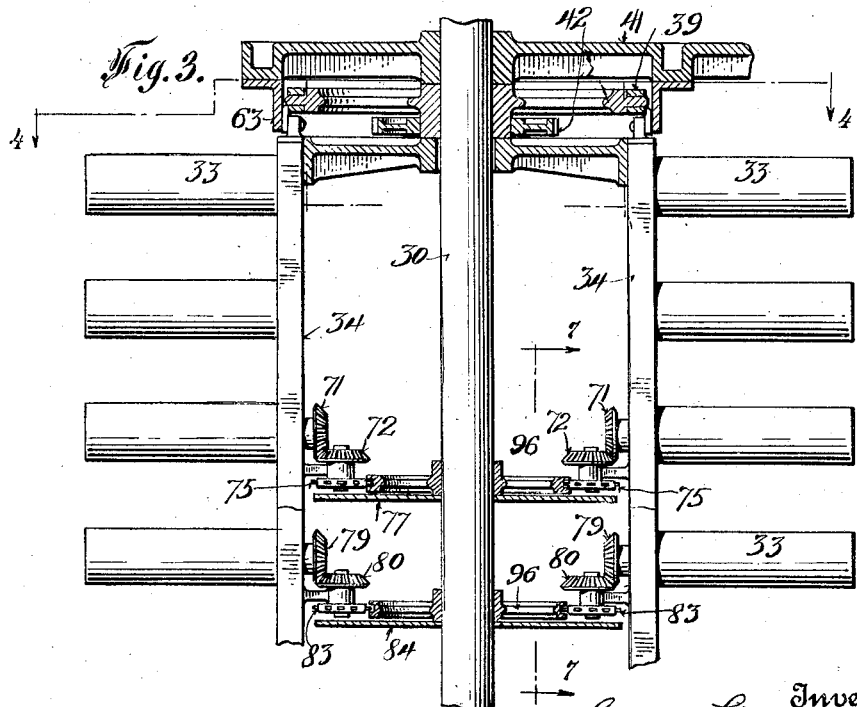
Inventors
George Lispenard and
Charles G. Hensley
By their Attorney
Charles G. Hensley

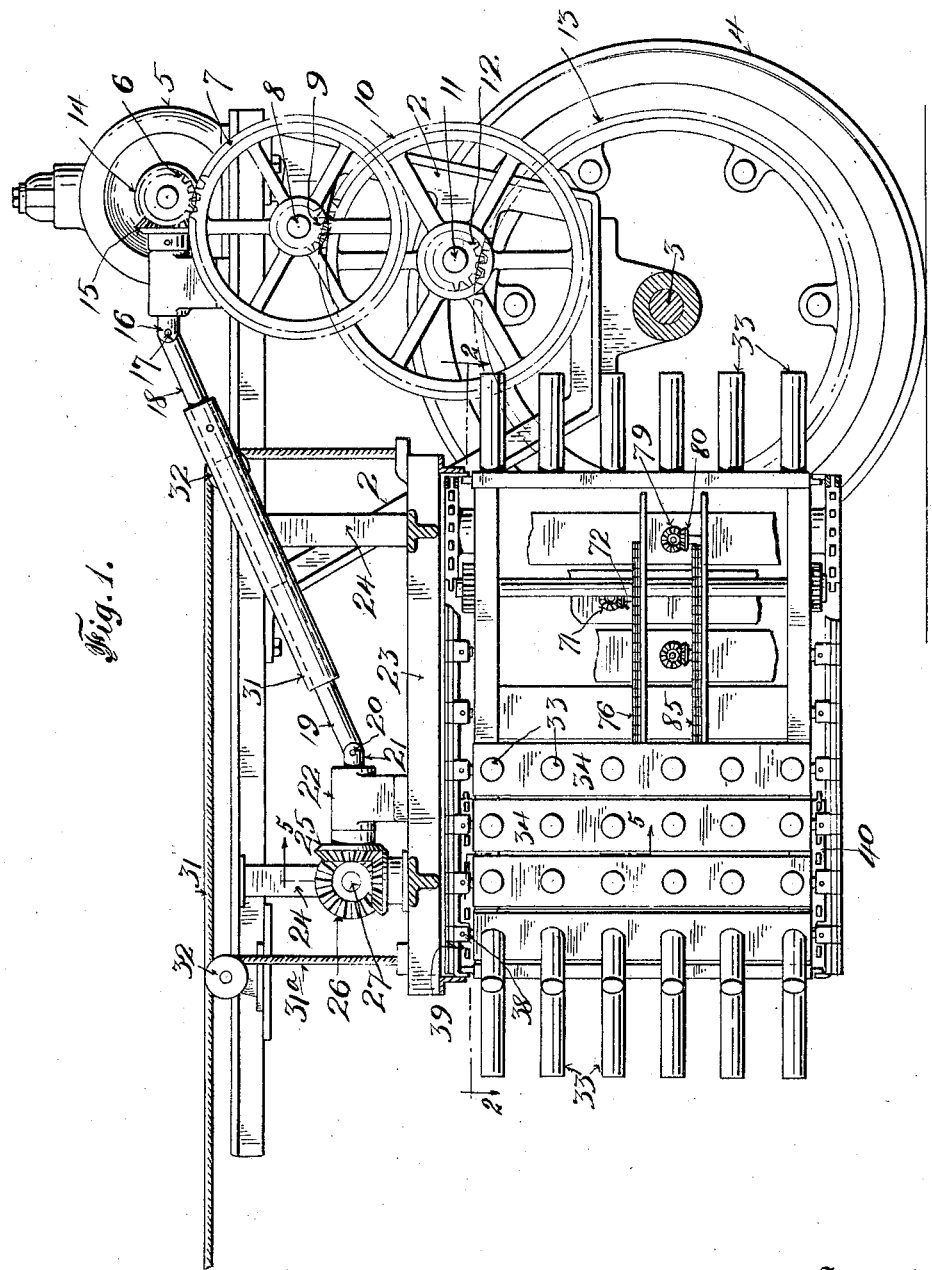

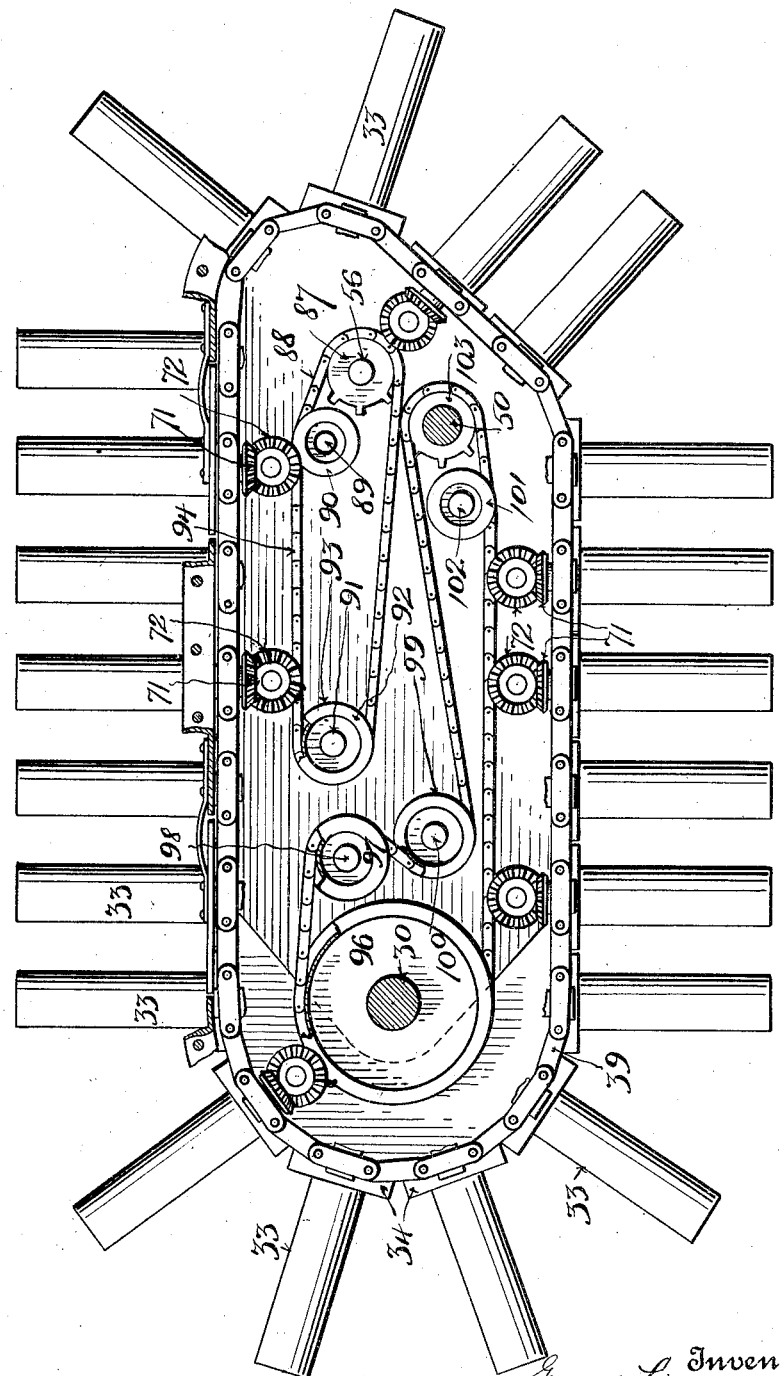

Sept. 17, 1929.    G. LISPENARD ET AL    1,728,556
COTTON HARVESTER
Filed Oct. 8, 1924    4 Sheets-Sheet 4
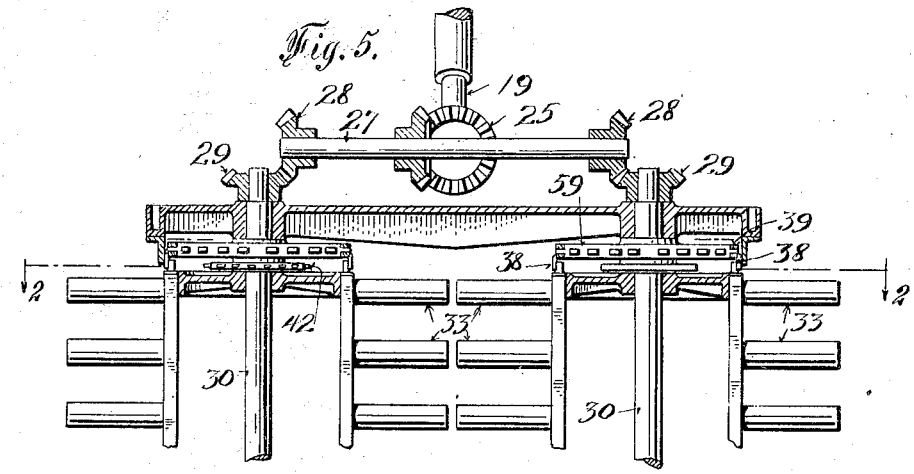
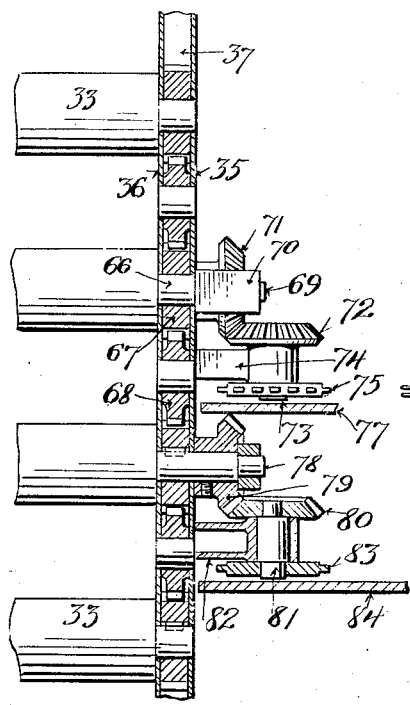
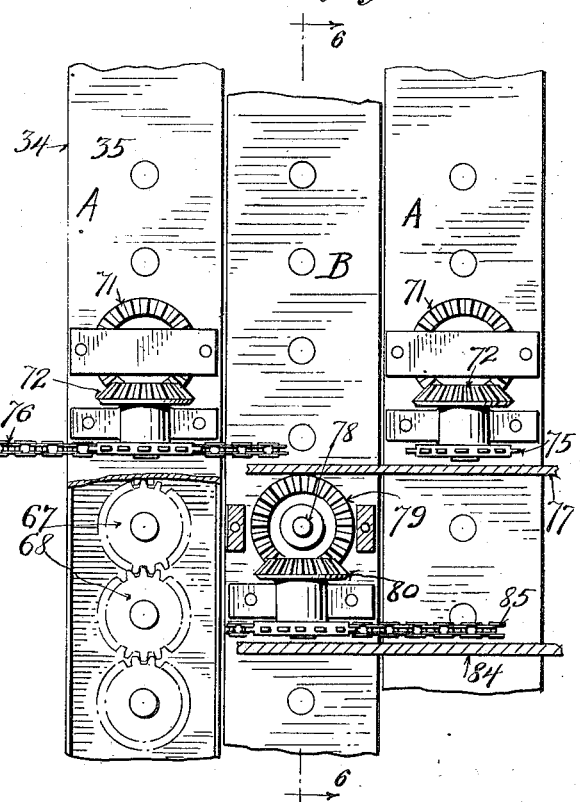

Patented Sept. 17, 1929

1,728,556

UNITED STATES PATENT OFFICE

GEORGE LISPENARD AND CHARLES G. HENSLEY, OF BROOKLYN, NEW YORK, ASSIGNORS TO WALLIS-LISPENARD COTTON HARVESTER CO. INC., OF NEW YORK, N. Y., A CORPORATION OF NEW YORK

COTTON HARVESTER

Application filed October 8, 1924. Serial No. 742,323.

Our invention relates to improvements in cotton harvesting or picking machines and it relates to a mechanical picker of that class in which a number of stems are arranged on traveling picker boxes arranged in the form of endless belts. The invention is an improvement over the machines shown in the patents of Wallis and Lispenard and reference may be had to the following United States patents as typical of the type of machine to which we have applied the invention; Nos. 1,084,214, January 13, 1914 and 1,059,478, April 22, 1913, and reference may be had to the United States Patent No. 1,041,309, October 15, 1922, as illustrating the type of picker stem whch we prefer to use as the picking element in the present machine.

One object of our invention is to provide a flexible drive for revolving the picker stems while they are in the cotton plants and for revolving them in a reverse direction when they are out of the plants for the purpose of discharging the picked cotton and at the same time to provide a drive which will revolve the stems not only while they are in the cotton plants but also while they are turning into or approaching the plants. In the prior Lispenard patents, in which a flexible drive for the picker stems was shown, the stems began to revolve after they were fully in the plants or when they came to the straight portion of one run of the picker belts. In the present case they are not only revolved at that time but while they are traveling around the pulleys and approaching the plants they are also revolving so that the picking action actually commences as soon as the picker stems approach the plants and before the latter have been compressed between the picking belts. This not only lengthens the period of picking of each stem for any given length picker mechanism but a considerable portion of the cotton is picked before the plants are compressed or crowded by the picking mechanism. While obtaining these advantages, we also retain all of the advantages of a flexible drive for the picker stems such as may be had with a series of chains for revolving the stems.

Another object of our invention is to provide a plurality of rows of chains for the picker boxes of each picker belt and to have the individual chains of each row operate on different sets of picker stems in order to distribute the strain on the several chains and thereby reduce the tendency to clog and break.

Another object is to retain the advantages set forth in the several prior Lispenard patents such, for instance as the swivel action of the picker boxes as they withdraw from the plants. Other advantages will be apparent from the following detailed description of our invention:

In the drawings forming part of this application,

Figure 1 is a sectional view through the center of the harvester showing one of the pair of picking mechanisms in elevation, Figure 2 is a sectional view taken on the line 2—2 of Figure 1, Figure 3 is a sectional view through a portion of the picking mechanism, Figure 4 is a sectional view taken on the line 4—4 of Figure 3, Figure 5 is a sectional view taken on the line 5—5 of Figure 1, Figure 6 is a sectional view taken on the line 6—6 of Figure 7, and Figure 7 is a sectional view taken on the line 7—7 of Figure 3.

We prefer to apply the present invention to a vehicle similar to the one shown in Patent No. 1,084,214 in which the picking mechanism may be bodily raised and lowered to correspond with the position of the row of plants in relation to the wheels of the vehicle and to drive the vehicle and all of the picking mechanism from a gasoline motor mounted on the vehicle; and in the drawings in this case we have shown only a portion of the whole vehicle. Such portions of the vehicle as are not shown herein may be made to correspond with said patent. In the drawings we have shown one of the side sills, 1 of the vehicle suitably supported on the axle yokes 2 through which is journaled the rear axle 3 of the vehicle. If the vehicle is constructed as shown in said last mentioned patent, the frame will be adapted to straddle a row of cotton plants while the wheels 4 travel in the furrows at opposite sides of the row. We have shown an ordinary gasoline motor 5 mounted on the vehicle frame and this serves to drive the rear wheels of the vehicle through the pinion 6 on the shaft of the motor, which pinion drives the gear 7 mounted on a stud shaft 8; and on this stud shaft there is a pinion 9 which drives the gear wheel 10 mounted on the stud shaft 11. On this latter stud shaft there is a pinion 12 which drives the annular gear 13 which is fastened to the rear wheel 4 of the vehicle. There is a mitre gear 14 on the motor shaft and this meshes with and drives a similar gear 15 on the short shaft 16. To the latter there is pivoted at 17 one member 18 of a telescoping shaft, and another member 19 of this shaft is pivoted at 20 to a short shaft 21 journaled in the bearing 22 which is mounted on the picker frame 23, which latter is movable vertically on the guides 24 fixed to the frame of the machine. The short shaft 21 has a mitre gear 25 which operates a similar gear 26 on the cross shaft 27 and on each end of the cross shaft there is a mitre gear 28 operating a gear 29 on the upper ends of the vertical shafts 30. The telescoping shaft 18, 19 also includes a sleeve 31 in which the shaft member 18 may slide or telescope and this sleeve is feathered to both shaft members 18, 19. Through these connections the power for operating the picking mechanism is transmitted to the shafts 30, in such a manner as to permit the movable frame 23 to be raised and lowered without interfering with the driving force. The movable or picker frame 23 is adapted to be raised bodily upon the guiding members 24 by means of cables 31ª traveling over the sheaves 32 on the vehicle frame and the mechanism for this may correspond with the aforesaid Lispenard patents.

The picker stems 33 are all mounted on vertically arranged boxes 34 which consist of the outer plates 35 the inner plates 36, and end pieces 37 connecting these plates to form rectangular boxes in which certain gears are housed, and they are in many respects similar to the picker boxes shown in said patents. These boxes are arranged vertically to form two endless belts and for this purpose they are pivotally connected by upper and lower pivotal connections 38 with the upper and lower endless chains 39, 40. As will be apparent in Figure 2 there will be a double set of picker boxes and chains forming a pair of picker belts opposed to each other. Except for the positions of these picker belts they are constructed alike so that a description of one will apply to both. As was above pointed out, the driving force for operating the picking mechanism is transmitted to the vertical shafts 30 and from these shafts power is applied not only for revolving the picker stems but also for causing the picker belts to be propelled. The latter are so propelled that the picker stems move backwardly at substantially the same speed that the vehicle moves forwardly and therefore the picker stems do not move in relation to the cotton plants to any great degree in the direction of the row of plants. In other words, the forward movement of the vehicle is negatived by the rearward travel of the picker stems in order that the latter will not bend or tear the cotton plants and this conforms to the construction in the said Lispenard patents.

The mechanism for operating the picker belts is as follows:

Below the top plate 41 of the picker frame there is arranged on the vertical shaft 30 a gear 42 which drives the gear 43 mounted on the stud shaft 44. This gear 43 drives another gear 45 mounted on the stud shaft 46 and the latter operates a gear 47 on the stud shaft 48. The latter gear operates a small gear 49 on the stud shaft 50 and this gear operates another gear 52 on the stud shaft 51; and the latter gear operates a gear 53 on the stud shaft 54; and the latter gear operates another gear 55 on the stud shaft 56; and the latter gear operates a gear 57 on the vertical shaft 58 which is arranged at the opposite end of the picking mechanism to the vertical shaft 30. The upper and lower chains 39, 40 forming part of the picker belts engage around several horizontally disposed sprocket wheels which define their path of travel. At the forward end of the picker mechanism there are sprocket wheels 59 loosely journaled on the shaft 30. At the rear end of the picking mechanism there are sprocket wheels 60 fixed to the shaft 58 and these sprockets are in the same planes with the sprockets 59 on the forward shaft 30. There are smaller sprockets 61 arranged on the shaft 62 and these sprockets are also in the same plane as the sprockets 60, 59. The endless chains 39, 40 traveling around these several sprockets take the course shown in Figure 2. Where the picker belts engage around the sprocket wheels 59 the picker stems are held in radial position as shown in Figures 2 and 4 by the guiding rail 63 which holds the picker boxes from turning on their pivots away from this radial position while the boxes are traveling around the sprockets 59. This is to cause the picker stems to approach the cotton plants in a spoke-like manner as the stems approach the straight run 64. The guiding rails 63 are also continued along the straight run on the picker side of the picking mechanism as well as along the straight run 65 of the discharge side of the picker mechanism, but where the picker stems are traveling from the sprocket 61 to the sprocket 60 they are free to swing on their pivots in order that they shall not drag or pull the cotton plants when withdrawing from them. This free swinging feature is the subject of one of the prior Lispenard patents. In the description of the picking mechanism we have shown how the chain of gears running from the forward vertical shaft 30 to the rear vertical shaft 50 causes the picker belts to travel around the several sprockets described above. The actual picking of the cotton takes place not only while the picker stems are traveling around the forward sprockets 59 and while on the straight run 64 but when the stems or their boxes pass around the guiding sprockets 61, where they withdraw from the plant, the stems then cease to revolve until they pass around the sprocket wheels 60 and commence to travel on the back run 65 when they are again revolved but in a direction reverse to the direction of revolution which took place during the picking operation. This reversal of movement causes the cotton which has been picked and collected by the picker stems to roll off or unfold from the stems and this picked cotton falls down into a conveyer (not shown) to be discharged in suitable bags. The mechanism for operating or revolving the several picker stems which forms the subject matter of our improvements is as follows:

Each picker stem is mounted revolvably on a stud shaft 66 which is rigidly mounted in the picker box and there is a vertical row of these picker stems mounted on each picker box, so that they will act at close intervals on the entire height of the cotton plants; and the picker stems on adjacent picker boxes will come sufficiently close to each other while traveling on the straight run 64 of the picker belts so that some stem will engage the ripe cotton boll in every plant over which the harvester passes. Each shaft 66 carrying a picker stem has a gear 67 fixed thereto and between adjacent picker stems there is arranged an intermediate pinion 68 within the picker box, so that power applied to one of the picker stems in any picker box will cause all of the stems on that box to revolve in unison and in the same direction at any given time. Certain of these picker boxes we have designated A to distinguish them from alternate boxes B because of the alternate relation of certain operating parts connected therewith. On each box designated A one of the picker stem shafts 66 is extended inwardly beyond the picker box to form an extension 69 having its extended end journaled in a bracket 70 secured to the picker box. All of these projecting shafts on the boxes designated A are in the same horizontal plane. Each shaft extension 69 has fixed thereto a mitre gear 71 which meshes with a similar gear 72 on the short shaft 73 arranged at right angles to the shaft extension 69 and journaled in a bracket 74 secured to the inner wall of the picker box. On the other end of the shaft 73 there is a sprocket wheel 75 and this is engaged by the horizontally disposed drive chain 76 to be referred to more in detail hereinafter. There is a plate 77 lying just below the path of the sprockets 75 to prevent the drive chain from drooping or sagging away from these several sprocket wheels. The above parts are arranged on each of the picker boxes designated A so that the operating force applied to the sprocket wheels 75 is transmitted through the mitre gears 72, 71 to the shaft of one of the picker stems of a picker box and through the chain of gears and pinions 67, 68 the operating force is distributed to all of the picker stems of a box. The several boxes B have their picker stems connected by a chain of gears and pinions in the same manner as those of the boxes A but the extended shaft 78 of these boxes is in a lower plane relative to the extensions 69 of the boxes A. On each shaft 78 there is a mitre gear 79 which meshes with the mitre gear 80 on the short shaft 81 journaled in the brackets 82 on the picker box B. On the lower end of the shaft 81 there is a sprocket wheel 83 and below the path of this sprocket wheel there is a plate 84 to prevent the driving chain 85 from drooping or sagging away from these sprocket wheels. There are separate drive chains for the several sprockets 75 and the several sprockets 83 arranged in different horizontal planes as follows:

On the shaft 56 there is a sprocket wheel 87 around which travels a drive chain 88 which is disposed with its link pivots or axes arranged vertically as distinguished from the arrangement shown in United States Patent 1,084,214. On the shaft 89 there is a pulley 90 and on the shaft 91 there is a pulley 92 and the endless chain 88 travels around these pulleys as well as the sprocket wheel 87 and it engages between the flanges 93 of these pulleys. The straight run 94 of this chain between the pulleys 90, 92 extends parallel to the path of travel of the several sprocket wheels 75 while the picker boxes are traveling on the rear or discharge run 65 of the picker belts. The sprocket wheels 75 while traveling with the rear run 65 of the picker belts engage the run 94 of this chain and the latter at that time causes the sprockets 75 to be revolved and this causes all of the picker stems of that particular picker box to be revolved in the direction necessary to discharge the picked cotton from the stems and this will be the reverse direction from that which takes place during the picking operation. The sprocket wheel 87 and the pulley wheels 90, 92 are all duplicated on the several shafts 56, 89, 91 at a lower level and around these travels another endless chain 88 which is parallel with the former chain 88 and this lower chain engages the sprocket wheels 83 carried with the picker boxes designated B, and it applies the operating force to all of the stems on these boxes. It will be apparent that both chains 88 perform the same function at the same time except that one operates the several picker stems of the boxes A as they come into operative relation to this chain, whereas the other one operates on the sprockets 83 of the boxes B to revolve the picker stems of these boxes as they come into operative relation to this chain. This divides the strain between the several chains and reduces the tendency to breakage. On the forward vertical shaft 30 there are flanged pulleys 96 which are arranged to revolve freely on this shaft. Behind each of these pulleys there is a small pulley 97 arranged on the stud shaft 98 and adjacent thereto there is another pulley 99 arranged on the stud shaft 100. Toward the rear of the picking mechanism there is a small pulley 101 arranged on the stud shaft 102 and adjacent to this there is a sprocket wheel 103 fixed to the vertical shaft 50. It may be noted that the latter shaft is the one which carries the gear 49 which is included in the chain of gears through which the power is transmitted for driving the picker belts, and that the chain of gears operates the shaft 50. The chain 76 is trained about the sprocket 103 and the pulleys 96, 97, 99 and 101. There is an endless chain 85 which travels around a second sprocket 103 and it is driven by the latter and it also engages around several pulleys which are duplicates of those which guide the chain 76 being arranged below them on the same shafts. This chain 85 is arranged with its pivots vertically disposed so that it may travel around the several pulleys and take the path represented in Figure 4. This chain is adapted to operate all of the sprocket wheels 83 on the several picker boxes B. In other words, the chains 76, 85 are exactly alike except for their positions and they operate on alternate picker boxes. These several chain drives are duplicated for both picker belts.

*Operation*

When the vehicle moves forwardly the two sets of picking devices straddle a row of cotton plants. The picker belts move in the directions indicated by the arrow in Figure 2 so that while the picker stems are on the inner runs 64 of the belts they are moving rearwardly at the same rate of speed that the vehicle moves forwardly so that their action in relation to the plant is to move in the arc of a circle into the plant from opposite sides, revolving while in the plant, and then they withdraw laterally from the plant. It will be understood that these picker stems have a number of inclined teeth for picking the cotton from the bolls and we prefer to use the kind of picker stem shown in U. S. Patent No. 1,059,478. While the picker stems are on the back run of the picker belts or away from the row of plants, while traveling toward the front of the picker mechanism, the chains 94 engage the several sprockets 75, 83 and revolve the picker stems backwardly or in the direction necessary to throw off the cotton from the stems of the character shown in said last mentioned patent. Owing to the direction of travel of the chains 94 in relation to the direction of travel of the picker stems at this time, the latter are revolved at an increased speed which is desirable for discharging the cotton. As each picker box moves forwardly, the sprocket 75 of the picker box if it be of the group A will engage in the links of the chain 76 and if the box is one of the group B its sprocket 83 will engage in the links of the corresponding chain 85 where these chains engage around the pulley 96. This starts the picker stems revolving in the direction necessary to cause the teeth of the picker stems to grasp and remove the cotton from the ripe bolls. From this it will be apparent that the stems are being revolved while they are rotating around the pulley 96, and therefore they are revolving before and during the time they are moving in spoke-like fashion into the plants. They continue to be revolved by the chains 76, 85 while they are traveling with the straight runs 64 of the chains 39, 40 and until the sprockets of the picker boxes pass the small pulleys 101. After they pass the latter pulleys the sprocket wheels 75, 83 disengage from the drive chains 76, 85 and they cease to revolve upon their own axes until the picker stems come on the back run of the picker belts and reengage with the chains 94. From this it will be apparent that the picker stems are continually revolved while entering the plants as well as during the period that they project into the plant and this is made possible by the arrangement of the drive chains 76, 85. The stems are preferably revolved during the picking operation at a lower speed than when they are discharging the picked cotton in order that the teeth of the stem may have time to draw the cotton out of the bolls and in order that the teeth will not cut or injure the unripe bolls and the stalks of the plants.

Having described our invention, what we claim is:

1. A cotton harvester having a flexible belt composed of picker boxes, means for guiding said belts to form extended runs thereof lengthwise of the harvester, revolvable picker stems carried by said boxes, and means for revolving said stems comprising a chain having its pivots arranged at right angles to the axes of the picker stems, and sprockets engaged by said chain to revolve said stems on their own axes.

2. A cotton harvester having a flexible belt composed of picker boxes, means for guiding said belts to form extended runs thereof lengthwise of the harvester, revolvable picker stems carried by said boxes, and means for revolving said stems, comprising a chain having its pivots arranged at right angles to the path of travel of the picker stems, sprockets operated by said chain, and mitre gears operated through said sprockets for revolving said picker stems on their own axes.

3. A cotton harvester having an endless, horizontally moving flexible belt and means for operating it, means for guiding said belt to form an extended run thereof lengthwise of the harvester, said belt including picker boxes, revolvable picker stems carried by said boxes and projecting horizontally therefrom, and means for revolving said stems, comprising a chain having its pivots arranged at right angles to the path of travel of the picker stems, and sprockets operated by said chain to revolve said stems on their own axes.

4. A cotton harvester having an endless, horizontally moving flexible belt and means for operating it, means for guiding said belt to form an extended run thereof lengthwise of the vehicle, said belt including picker boxes, revolvable picker stems carried by said boxes and projecting laterally therefrom, and means for revolving said stems, comprising a chain having its pivots arranged at right angles to the path of travel of the picker stems, sprockets operated by said chain to revolve said stems on their own axes, and means for operating said chain independently of the movement of the picker belt.

5. A cotton harvester having a movable flexible picker belt including a plurality of picker boxes, means for guiding said belt whereby it will have an arcuate path followed by a substantially straight run, revolvable picker stems on said boxes, projecting laterally therefrom, and means for revolving said stems on their own axes comprising a chain having its pivots arranged at right angles to the path of travel of said picker boxes, gears and sprockets mounted on said picker belt, said sprocket being engaged and operated by said chain to revolve said stems.

6. A cotton harvester having a movable flexible picker belt including a plurality of picker boxes and means for operating said belt, revolvable picker stems on said boxes, projecting laterally therefrom, and means for revolving said stems on their own axes comprising a chain running parallel to said belt and having its pivots arranged at right angles to the path of travel of said picker boxes, sprockets mounted on said picker boxes and engaged and operated by said chain to revolve said stems.

7. A cotton harvester having a movable flexible picker belt including a plurality of picker boxes, means for operating said belt, means for guiding said belt whereby it will have an arcuate path followed by a substantially straight run, revolvable picker stems projecting from said boxes, and means for revolving said stems on their own axes, comprising a chain running parallel to said arcuate and straight portions of said belt and having its pivots arranged at right angles to the path of said belt and sprockets mounted on and movable with said boxes, said sprockets being engaged and operated by said chain to revolve said stems.

8. A cotton harvester having a movable flexible picker belt including a plurality of picker boxes, means for operating said belt, means for guiding said belt whereby it will have an arcuate path followed by a substantially straight run, revolvable picker stems projecting from said boxes, and means for revolving said stems on their own axes, comprising a chain disposed with its pivots arranged at right angles to the path of travel of said belt, flanged pulleys for guiding said chain and sprockets mounted on and moving with said picker belt, said sprockets being engaged and operated by said chain for revolving said stems.

9. A cotton harvester having a movable flexible picker belt including a plurality of picker boxes, revolvable picker stems projecting from said boxes, means for guiding said belt whereby it will have one run where the stems will be projected into the plants for picking and another run where the stems will be withdrawn from the plants, with an arcuate path between said runs, a chain having its pivots disposed at right angles to the path of travel of said belt, and means for guiding said chain parallel to the arcuate path of said belt, and to the picking run of said belt, another chain traveling parallel to the discharge run of said belt, and sprockets mounted on and movable with said picker belt for revolving said stems, arranged to be revolved in one direction while traveling on the picker run of said belt by engagement of one of said chains with said pockets and to be engaged and revolved in a reverse direction by the other of said chains while traveling with the other run of said belt.

10. A cotton harvester having a plurality of movable flexible picker belts adapted to straddle a row of plants, said belts having picker boxes and revolvable picker stems projecting from said boxes, means for guiding said belts so that they travel in arcuate paths and then in opposed, substantially straight runs, and means for revolving said stems on their own axes, comprising chains having their pivots arranged at right angles to the path of travel of said belts, said chains running parallel with said arcuate paths and said straight runs of said belts and sprockets mounted on and traveling with said boxes and engaged and operated by said chains for revolving said stems.

11. A cotton harvester having a picker belt including a plurality of picker boxes, revolvable picker stems projecting from said boxes, chains arranged at different levels, sprockets on said boxes operated by said chains to revolve said stems, the sprockets on said boxes being arranged at different levels whereby the stems of certain boxes will be operated by one of said chains and stems of other of said boxes will be simultaneously operated by another of said chains.

12. A cotton harvester having a picker belt having a picking and a discharging run, said belt having picker boxes, revolvable picker stems projecting from said boxes, chains arranged at different levels, sprockets on said boxes operated by said chains to revolve said stems, the sprockets on said boxes being arranged at different levels, the stems of certain boxes being operated by one of said chains while on the picking run of said belt and the stems of another of said boxes being operated by another of said chains while said latter stems are on the picking run of said belt.

13. A cotton harvester having a picker belt having picker boxes, revolvable picker stems projecting from said boxes adjacent parallel chains arranged at different heights and with their pivots at right angles to the path of said belt, sprockets on said boxes arranged whereby said chains each operate the sprockets of alternate boxes, and mitre gears through which the power applied to said sprockets is transmitted to said stems.

Signed at the city, county and State of New York, this 2nd day of October, 1924.

GEORGE LISPENARD.
CHARLES G. HENSLEY.